(12) United States Patent
Plotnik et al.

(10) Patent No.: US 10,505,894 B2
(45) Date of Patent: Dec. 10, 2019

(54) ACTIVE AND PASSIVE METHOD TO PERFORM IP TO NAME RESOLUTION IN ORGANIZATIONAL ENVIRONMENTS

(71) Applicant: Microsoft Technology Licensing, LLC, Redmond, WA (US)

(72) Inventors: Idan Plotnik, Savion (IL); Sivan Krigsman, Hertzliya (IL); Benny Lakunishok, Holon (IL); Tal Arieh Be'ery, Petach Tikva (IL); Michael Dubinsky, Tel Aviv (IL); Michael Dolinsky, Netanya (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 99 days.

(21) Appl. No.: 15/425,702

(22) Filed: Feb. 6, 2017

(65) Prior Publication Data
US 2018/0109490 A1    Apr. 19, 2018

Related U.S. Application Data

(60) Provisional application No. 62/408,014, filed on Oct. 13, 2016.

(51) Int. Cl.
*H04L 12/00* (2006.01)
*H04L 29/12* (2006.01)
(Continued)

(52) U.S. Cl.
CPC .......... *H04L 61/2503* (2013.01); *H04L 43/02* (2013.01); *H04L 61/1511* (2013.01);
(Continued)

(58) Field of Classification Search
CPC ........ H04L 29/12066; H04L 29/12264; H04L 29/12216; H04L 41/12; H04L 63/103; H04L 61/1115; H04L 67/22
(Continued)

(56) References Cited

U.S. PATENT DOCUMENTS 5,917,808 A    6/1999 Kosbab
6,122,639 A    9/2000 Babu et al.
(Continued)

FOREIGN PATENT DOCUMENTS

WO    2010123385 A1    10/2010

OTHER PUBLICATIONS

"Traffic Profiling", Retrieved at: https://www.cisco.com/c/en/us/td/docs/security/firepower/60/configuration/guide/fpmc-config-guide-v60/Creating_Traffic_Profiles.pdf, Jan. 1, 2016, 10 Pages.
(Continued)

*Primary Examiner* — Frantz Coby
(74) *Attorney, Agent, or Firm* — Merchant & Gould

(57) ABSTRACT

A system and method for performing IP to name resolution in organizational environments. IP addresses are determined for devices utilizing the corporate network. An IP address is resolved to a first device name and then the same IP address is subsequently resolved to a second device name. A profile is generated such as a timeline for the IP address including both the first and second device names. The timeline may be queried to determine whether the first device name or the second device name was associated with the IP address during a period of time.

18 Claims, 4 Drawing Sheets

(51) Int. Cl.
*H04L 12/26* (2006.01)
*H04L 29/08* (2006.01)
*H04L 29/06* (2006.01)

(52) U.S. Cl.
CPC ...... *H04L 63/0236* (2013.01); *H04L 63/1425* (2013.01); *H04L 67/30* (2013.01)

(58) Field of Classification Search
USPC .................. 709/223, 245, 203, 220, 221
See application file for complete search history.

(56) References Cited

U.S. PATENT DOCUMENTS

| | | | |
|---|---|---|---|
| 7,174,390 B2 | 2/2007 | Schulter et al. | |
| 7,295,543 B2* | 11/2007 | Kikuchi | H04L 12/2803 370/338 |
| 7,480,710 B1* | 1/2009 | Olson | H04L 29/12264 709/223 |
| 7,673,049 B2* | 3/2010 | Dinello | H04L 63/0236 709/226 |
| 7,689,671 B2* | 3/2010 | Bhakta | H04L 29/12047 709/219 |
| 7,725,602 B2* | 5/2010 | Liu | H04L 29/12066 709/217 |
| 7,769,851 B1 | 8/2010 | Guruswamy et al. | |
| 7,877,510 B2* | 1/2011 | Datta | H04L 29/12066 709/203 |
| 7,930,428 B2* | 4/2011 | Drako | H04L 61/1511 709/245 |
| 8,065,408 B2 | 11/2011 | Shaik et al. | |
| 8,073,953 B2* | 12/2011 | Christian | H04L 29/12132 709/203 |
| 8,160,062 B2* | 4/2012 | Qian | H04L 43/0811 370/229 |
| 8,185,953 B2 | 5/2012 | Rothstein et al. | |
| 8,316,440 B1* | 11/2012 | Hsieh | G06F 11/108 713/168 |
| 8,364,785 B2* | 1/2013 | Plamondon | H04L 67/2852 709/219 |
| 8,578,034 B2 | 11/2013 | Schemitsch | |
| 8,769,057 B1* | 7/2014 | Breau | H04L 61/103 709/220 |
| 8,774,056 B2 | 7/2014 | Lueckenhoff et al. | |
| 8,955,119 B2 | 2/2015 | Zhao | |
| 9,054,952 B2 | 6/2015 | Rothstein et al. | |
| 9,055,092 B2 | 6/2015 | Wen et al. | |
| 9,154,507 B2 | 10/2015 | Ashley et al. | |
| 9,378,361 B1 | 6/2016 | Yen et al. | |
| 9,621,431 B1 | 4/2017 | Cardente et al. | |
| 9,749,336 B1* | 8/2017 | Zhang | H04L 63/14 |
| 10,091,312 B1* | 10/2018 | Khanwalkar | H04L 67/22 |
| 2003/0154306 A1* | 8/2003 | Perry | H04L 29/12009 709/245 |
| 2006/0031385 A1* | 2/2006 | Westerdal | H04L 29/12066 709/217 |
| 2006/0056445 A1 | 3/2006 | Lin | |
| 2007/0097992 A1* | 5/2007 | Singh | H04L 29/12216 370/395.54 |
| 2007/0133576 A1 | 6/2007 | Tsuge et al. | |
| 2008/0222307 A1* | 9/2008 | Bhakta | H04L 29/12047 709/245 |
| 2009/0327489 A1* | 12/2009 | Swildens | G06F 9/505 709/224 |
| 2010/0071061 A1 | 3/2010 | Crovella et al. | |
| 2010/0151816 A1* | 6/2010 | Besehanic | G06Q 30/02 455/405 |
| 2010/0153525 A1* | 6/2010 | Parekh | G06F 17/30241 709/221 |
| 2011/0035437 A1* | 2/2011 | Toumura | H04L 29/12066 709/203 |
| 2011/0305160 A1* | 12/2011 | Green | H04L 41/12 370/252 |
| 2014/0006577 A1* | 1/2014 | Joe | H04L 61/1511 709/223 |
| 2014/0172947 A1 | 6/2014 | Ghai et al. | |
| 2015/0264068 A1 | 9/2015 | Beauchesne | |
| 2015/0271192 A1 | 9/2015 | Crowley | |
| 2015/0326594 A1 | 11/2015 | Chari et al. | |
| 2016/0006693 A1 | 1/2016 | Salcedo | |
| 2016/0344693 A1 | 11/2016 | Wetterwald et al. | |
| 2018/0191701 A1 | 7/2018 | Kong et al. | |

OTHER PUBLICATIONS

Gokcen, et al., "Can We Identify NAT Behavior by Analyzing Traffic Flows?", In Proceedings of IEEE Security and Privacy Workshops, May 17, 2014, 8 Pages.

"International Search Report and Written Opinion Issued in PCT Application No. PCT/US2017/055456", dated Dec. 5, 2017, 10 Pages.

Huffam, Tim, "How to lookup a user name and machine name using an IP address (on windows)", Published on: May 3, 2006 Available at: http://geekswithblogs.net/TimH/archive/2006/05/03/77070.aspx.

Horowitz, Michael, "Fing is a great app to see who is on your network", Published on: Feb. 27, 2012 Available at: http://www.computerworld.com/article/2472460/networking/fing-is-a-great-app-to-see-who-is-on-your-network.html.

Castelino, Sanjay, "Managing the BYOD Chaos with Network and Security Information Monitoring and Management", Published on: Jun. 29, 2012 Available at: http://www.itbriefcase.net/network-and-security-information-monitoring-and-management.

"Cisco Identity Services Engine Administrator Guide, Release 1.4", Published on: May 27, 2015 Available at: http://www.cisco.com/c/en/us/td/docs/security/ise/1-4/admin_guide/b_ise_admin_guide_14/b_ise_admin_guide_14_chapter_010000.html.

"Non Final Office Action Issued in U.S. Appl. No. 15/606,783", dated Feb. 7, 2019, 20 Pages.

"Final Office Action Issued in U.S. Appl. No. 15/606,783", dated Jul. 5, 2019, 23 Pages.

* cited by examiner

ACTIVE AND PASSIVE METHOD TO PERFORM IP TO NAME RESOLUTION IN ORGANIZATIONAL ENVIRONMENTS

CROSS-REFERENCE TO RELATED APPLICATIONS

The application claims priority to U.S. Provisional Patent Application No. 62/408,014 titled "ACTIVE AND PASSIVE METHOD TO PERFORM IP TO NAME RESOLUTION IN ORGANIZATIONAL ENVIRONMENTS" filed Oct. 13, 2016, the disclosure of which is hereby incorporated by reference in its entirety.

BACKGROUND

Corporate enterprises are interested in security and IT specialists have the need to locate and identify users and devices. On a network using the Transmission Control Protocol/Internet Protocol (TCP/IP), it is often necessary to convert or resolve an IP address to an actual host or device name. However, IP addresses are dynamic. In other words, an IP address which is relevant to a computer at one point in time may no longer be relevant to that same computer just a few seconds later.

Moreover, when a user's login credentials are stolen and a hacker uses those credentials to login at another computer it results in another IP address being associated with that user. The two IP addresses by themselves may not be informative enough for the IT specialist to investigate but ascertaining the names of those two computers provides additional information when determining whether to investigate. Resolving IP addresses to device names may also be useful in identifying impossible travel scenarios.

SUMMARY

This summary is provided to introduce a selection of concepts in a simplified form that are further described below in the Detailed Description section. This summary is not intended to identify key features or essential features of the claimed subject matter, nor is it intended as an aid in determining the scope of the claimed subject matter.

According to one aspect disclosed herein, a method is presented for performing IP to name resolution in organizational environments. The method disclosed herein includes determining IP addresses for devices utilizing a network. The method also includes resolving a first IP address to a first device name and subsequently resolving the first IP address to a second device name. A profile such as a timeline is generated for the first IP address having been resolved to both the first device name and the second device name. The method may also include querying the profile to determine whether the first device name or the second device name was associated with the first IP address during a period of time.

According to another aspect disclosed herein, a system is presented for performing IP to name resolution in an enterprise network comprised of a plurality of locations to which devices may access the network. The system disclosed herein includes a network service provider operable to authenticate devices seeking to access the network and a gateway, in communication with the network service provider, operable to monitor communications from the devices accessing the network via the network service provider. The system also includes a center, in communication with the gateway, operable to aggregate connection information from the devices accessing the network and to receive the collected traffic from the gateway. To perform IP to name resolution the center is operable to generate a profile for a first IP address having been resolved to both the first device name and the second device name. The center may be further operable to query the profile to determine whether the first device name or the second device name was associated with the first IP address during a period of time.

According to yet another aspect disclosed herein, a computer-readable storage medium including instructions for performing IP to name resolution in an enterprise network is disclosed. The instructions executed by a processor include determining IP addresses for the devices utilizing the enterprise network. The instructions also include resolving a first IP address to a first device name and subsequently resolving the first IP address to a second device name. The instructions then include generating a profile for the first IP address having been resolved to both the first device name and the second device name, wherein generating the profile of the first IP address comprises generating a timeline including the first and second device names. The instructions then also include querying the profile to determine whether the first device name or the second device name was associated with the first IP address during a period of time. In order to determine IP addresses for the devices utilizing the network, the instructions may include actively querying a device to ascertain the first IP address and/or collecting traffic over the network from the same device and passively determining from the collected traffic the first IP address associated with the same device.

Examples are implemented as a computer process, a computing system, or as a computer program product for one or more computers. According to an aspect, the computer program product is a server of a computer system having a computer program comprising instructions for executing a computer process.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the claims.

BRIEF DESCRIPTION OF THE DRAWINGS

The accompanying drawings, which are incorporated in and constitute a part of this disclosure, illustrate various aspects. In the drawings.

DETAILED DESCRIPTION

Figure 1:
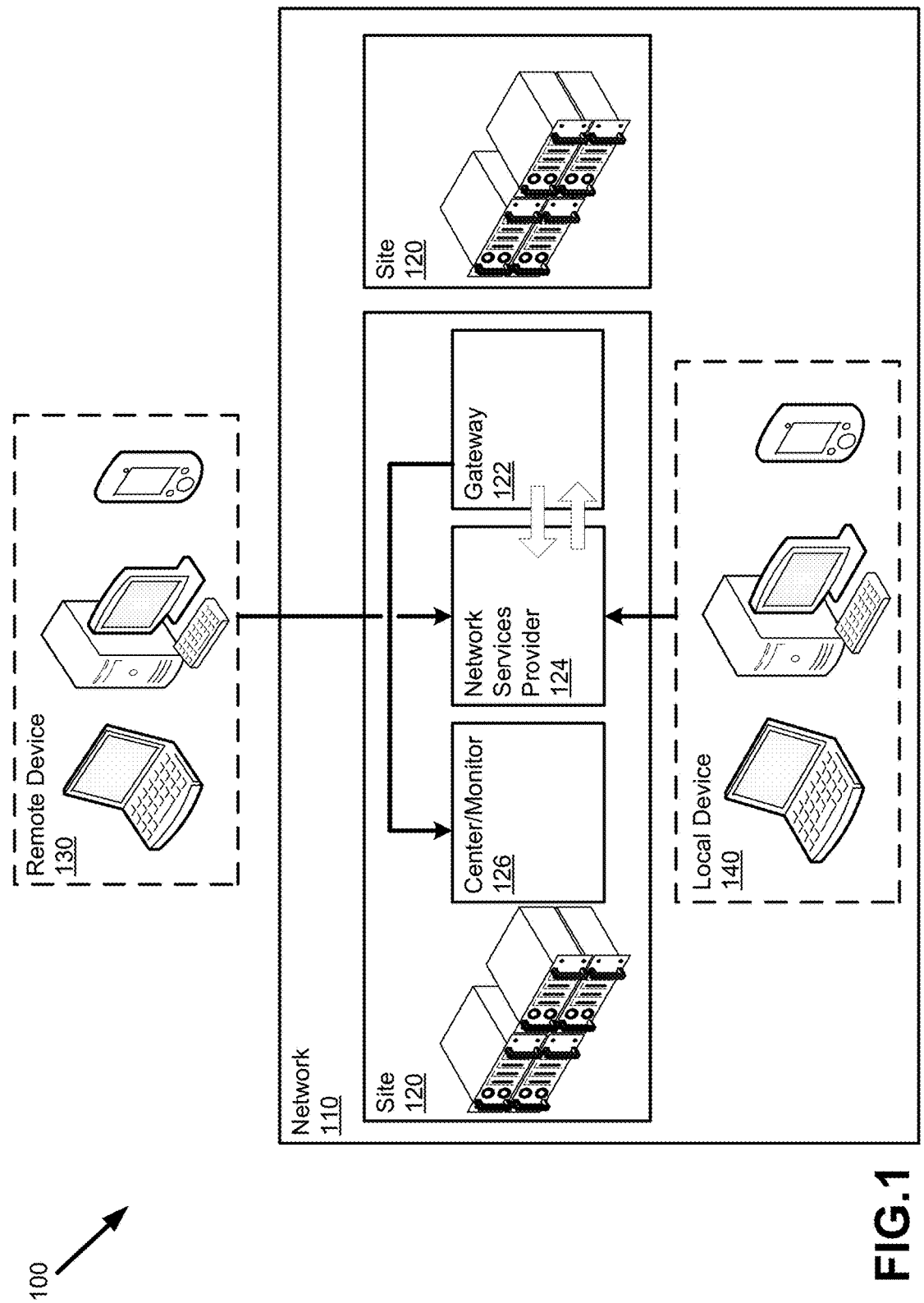
FIG. 1 illustrates an example environment having an enterprise network utilized in various embodiments.

The following detailed description refers to the accompanying drawings. Wherever possible, the same reference numbers are used in the drawings and the following description refers to the same or similar elements. While examples may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description is not limiting, but instead, the proper scope is defined by the appended claims. Examples may take the form of a hardware implementation, or an entirely software implementation, or an implementation combining software and hardware aspects. The following detailed description is, therefore, not to be taken in a limiting sense.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

FIG. 1 illustrates an example computing environment 100 in which the present disclosure may be practiced. As illustrated, an enterprise such as enterprise network 110 is divided into multiple sites 120. A given site 120 may be accessed remotely by a remote device 130, which is located externally to the enterprise network 110 or remotely from the sites 120, or may be accessed locally by a local device 140, which is located internally to the enterprise network 110 or locally to the sites 120. Although two sites 120, one remote device 130, and one local device 140 are illustrated, the number of sites 120, remote devices 130, and local devices 140 may be greater than or less than what is illustrated in the example environment 100.

The enterprise network 110 provides a single operating environment over which computing devices may interact despite being spread across multiple sites 120 and domains (e.g., for a company, a governmental agency, an educational institution spread over a large geographical area). Each site 120 of the enterprise network 110 includes: a gateway 122, a network service provider 124, which is in communication with the gateway 122 and operable to authenticate entities seeking to access the enterprise network 110, and a monitor 126 which is typically referred to as the center 126. The center 126 is in communication with the gateway 122 and operable to aggregate connection information from the remote devices 130 to manage entity location data. Gateways 122 and network service providers 124 will be understood by one of skill in the art to include hardware devices and software running on those devices to provide the functionalities thereof. In various aspects, the gateway 122 may be run on dedicated hardware or may be provided via software on a computing device used for several purposes, such as, for example, on the same hardware as the network service provider 124. In additional aspects, the enterprise network 110 may make use of fewer centers 126 than sites 120; some or all of the sites 120 may share a center 126.

The remote device 130 and local device 140 are illustrative of a multitude of computing systems including, without limitation, desktop computer systems, wired and wireless computing systems, mobile computing systems (e.g., mobile telephones, netbooks, tablet or slate type computers, notebook computers, and laptop computers), hand-held devices, multiprocessor systems, microprocessor-based or programmable consumer electronics, minicomputers, printers, and mainframe computers.

Remote devices 130 and local device 140 are operated by users, who may be humans or automated systems (e.g., "bots") that request connections to one or more sites 120 of the enterprise network 110. For example, an instance of the SIRI®, GOOGLE NOW™ or CORTANA® electronic assistant (available from Apple, Inc. of Cupertino, Calif.; Alphabet, Inc. of Mountain View, Calif.; and Microsoft, Corp. of Redmond, Wash., respectively) may request a connection in response to or in anticipation of queries from a human user.

The remote devices 130 and local devices 140 access the enterprise network 110 by being authenticated by a network service provider 124 of a site 120. Remote devices 130 may connect to a given site 120 via a Virtual Private Network (VPN) connection or other tunnel to initiate a session, whereas local devices 140 connect to the site 120 at which they are located. Whether a given device is a remote device 130 or a local device 140 depends on how it connects to the enterprise network 110, and a given device may be both a remote device 130 and a local device 140. For example, a user may use a local device 140 while in the office to connect locally to the enterprise network 110 and take that device home and log into the enterprise network 110, making the device a remote device 130 for the remote session. Entities (devices or user accounts) connect to a given site 120 which is then noted and mapped by the network service provider 124 and the gateway 122 as using the given site 120.

The network packets received by the network service provider 124 from the clients 130, 140 are replicated and communicated to the gateway 122. Via the replicated network traffic, the gateway 122 passively observes the network address information from the devices 130, 140 connecting to the associated site 120 and will decide whether to store those addresses. Each time a user account successfully logs into the site 120 and establishes a session on the enterprise network 110, the gateway 122 may store the address information associated with the login request.

Local devices 140 may also have their connection attempts to the network service provider 124 and activity session logged by the gateway 122 for security purposes. As will be appreciated, local devices 140 are associated with IP addresses internal to the enterprise network 110, which may be masked for use within the enterprise network 110, and therefore may produce spurious results. The gateway 122 will note the entities associated with the login and session (e.g., the user account and devices), and will assign the location (calculated or physical) of the site 120 to the entity at the time of login.

In various aspects, the gateway 122 may store and use, store and filter, or exclude from storage connection attempts that were rejected by the network service provider 124 (e.g., an incorrect username or password were provided). Similarly, the gateway 122 may store and filter (or block from storage) connection attempts received from a list of addresses that are associated with blocked parties, unreliable geolocation, or whose duration or number of connections meet an unreliability threshold (e.g., multiple short connections may indicate an unstable connection, and may be filtered out or ignored).

Other configurations of computing environments such as a cloud-based environment having shared processing resources and data provided by server and computer resources as well as cloud storage may also be used for providing users within the enterprise with various capabilities.

Still referring to the example on-premises computing environment 100 of FIG. 1, the network service provider 124 operates to accept communications from the devices 130, 140 accessing the network 110. The gateway 122, communicating with the network service provider 124, operates to aggregate connection information from the devices 130, 140 accessing the network 110. For example, in one or more embodiments, all or part of the collected traffic may be tunneled traffic from remote device 130 connected via VPN or other tunnel where users are allowed access to network services. Software agents on the devices 130, 140 are not required to collect traffic and ascertain the login and logoff information. The gateway 122, the network service provider 124 and the center 126 may collectively be referred to as a network name resolver (NNR) or just the gateway 122 and the center 126 may referred to as the NNR.

The NNR via the center 126 is further operable to determine IP addresses for device 130, 140 utilizing the network 110 from the collected traffic. An IP address may be ascertained by actively querying a device 130, 140. Thus, one or more requests are sent via network packets utilizing one or more protocols to the device 130, 140 and if a response is received the current IP address can be determined pursuant to information provided via the particular protocol. Alternatively, or in addition to actively sending a request to the device 130, 140, the IP address can be passively determined from network traffic collected from the device 130, 140 on the network 110 pursuant to information available via particular protocols. Authentication packets via one or more authentication protocols can be used to determine whether the collected traffic came from a particular device. For example, the gateway 122 when passively monitoring the traffic from devices 130, 140 can identify when the user is actively on these devices and, therefore, the IP address upon authenticating each login. Utilization of protocols can include protocols such as NT LAN Manager (NTLM), Kerberos, Lightweight Directory Access Protocol (LDAP) and Network Time Protocol (NTP) or any other suitable authentication protocol.

The center 126 or the gateway 122 may include a cache for caching results such as the IP addresses in the network traffic. The cache may be updated with the current state of IP addresses that are discovered and then checked to determine which IP addresses have been identified. The gateway also resolves IP address to device names. For example, initially a first IP address may be resolved to a first device name. Later, the first IP address may be subsequently resolved to a second device name. Thus, the first IP address was assigned to two different devices over time. The center 126 may also generate a profile for a particular IP address which identifies the devices names that have been associated with that IP address over time. The cache is utilized to generate the profile with the first IP address and the first and second device names.

Each resolved device name that is added to the cache is timestamped with the time of resolution. High substitution IP addresses may be determined by counting the number of different names on the same IP address. The number of names changes is sometimes referred to as "invalidations" or "invalidation count." When the number of invalidations reaches a pre-determined amount within a particular timespan the IP address is defined as a high substitution IP address which is then subject to investigation by IT specialists.

From the profile, an IT specialist and other processes are able to identify when the device name associated with a particular IP address changes. Moreover, by querying the profile, the IT specialist or other process is able to determine what device name is associated with a particular IP address during a particular time period. The profile may correspond with a timeline or timetable of device names.

Because IP address are dynamic, subsequent resolving of the same IP addresses may be necessary which yields additional device names. Also, any IP address may be resolved any number of times resulting sometimes in the same or different device names. For example, in addition to identifying and resolving the first IP address as described above, a second IP address may be determined from the same or other devices. The second IP address would then be resolved to identify a third device name and then subsequently resolved again to identify a fourth device name. Thus, a profile of the second IP address can be generated having the third and fourth device names. The profile of the second IP address may be queried to determine whether the third device name or the fourth device name was associated with the second IP address during a period of time. For example, the period of time can correspond with all or a portion of a day or all or a portion of several days. Also, the period of time may correspond with a login session or multiple login sessions. In one or more embodiments, a profile may be generated based on more than one resolved IP address. For example, a profile may include both the first and second IP addresses resolved to the first and second device names as well as the third and fourth device names, respectively.

The profile may be generated and displayed in a user interface illustrating the resolved device names and, if desirable, without the corresponding IP address. All or part of the profile may be selectable. In one or more examples, the profile may include a line, pie, or bar graph or a histogram indicating the various device names for one or more resolved IP addresses over time. The profile may also depict the length of time each device name is associated with a particular IP address. Moreover, the profile may indicate whether the IP address was actively queried or which authentication protocol was used to passively identify the IP address. The profile may also disclose devices which one or more users recently logged onto as well as to any resources that were accessed. The profile may also disclose whether each IP address was actively or passively determined.

Figure 2:
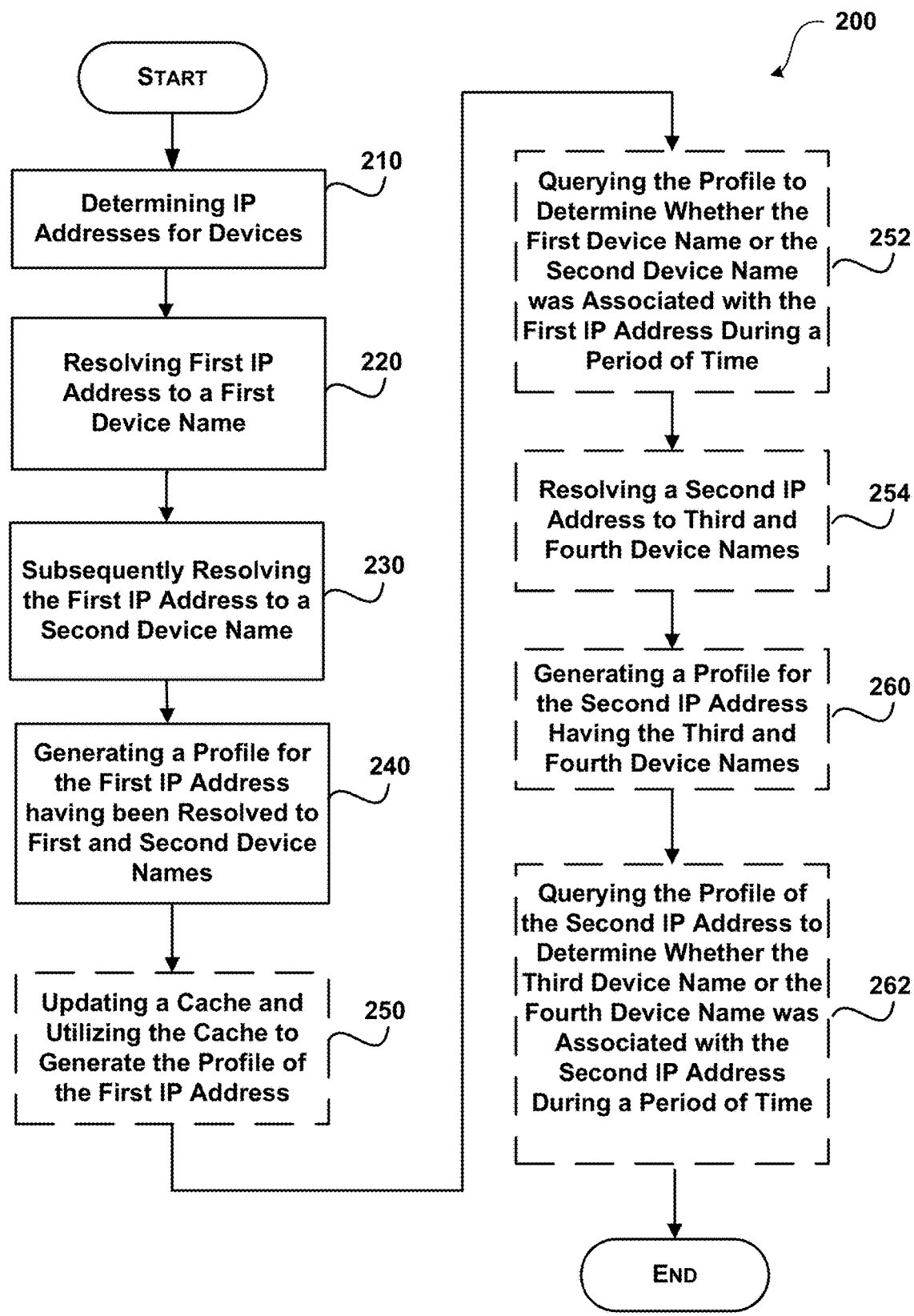
FIG. 2 illustrates a flowchart showing general stages involved in performing IP to name resolution in an organizational environment according to at least one embodiment disclosed herein.
Figure 3:
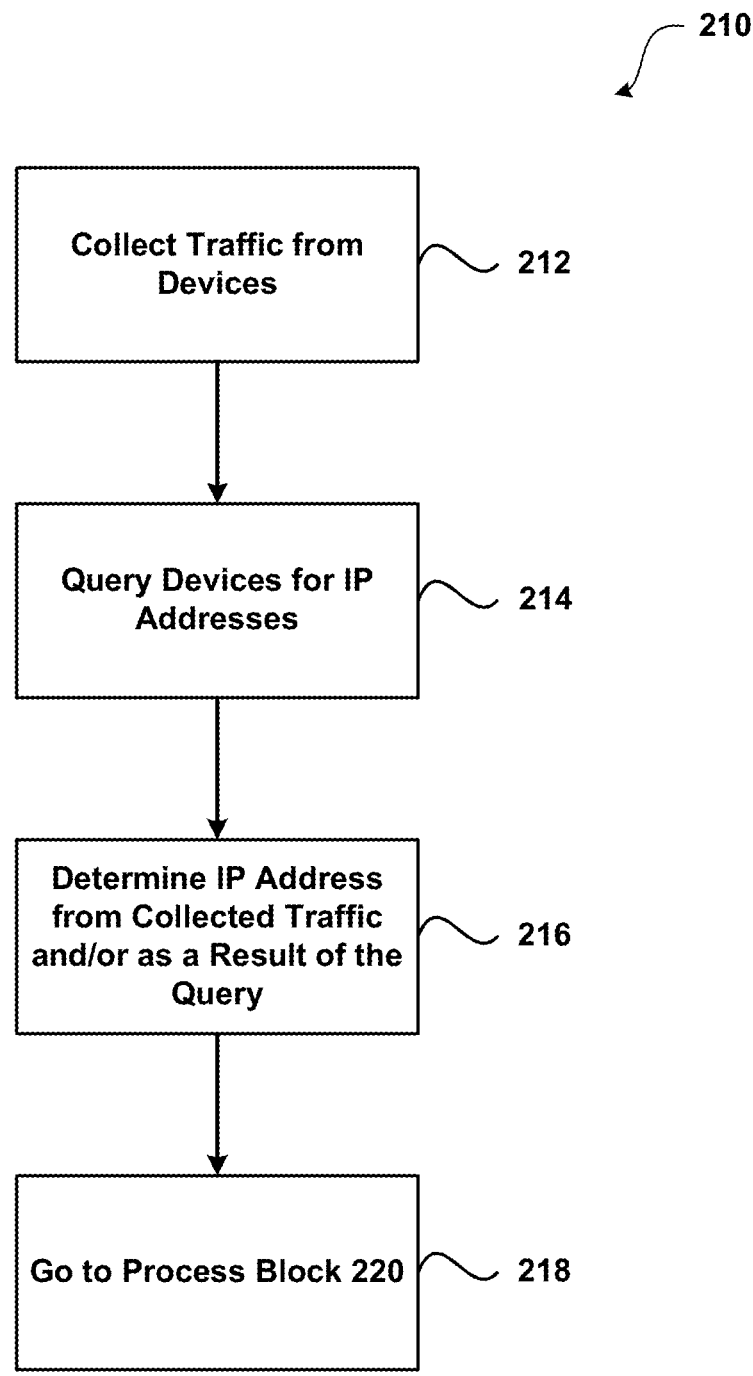
FIG. 3 illustrates a flowchart corresponding with one of the process blocks of the flowchart of FIG. 2 according to at least one embodiment disclosed herein.

The use of the gateway 122 and the center 126 as described above to determine and resolve IP addresses also constitutes an inventive method. In practicing the method 200 for performing IP to name resolution as illustrated in FIGS. 2 and 3, the steps include process block 210 for determining IP addresses for devices utilizing the network. At process block 220 the method 200 includes resolving a first IP address to a first device name and at process block 230 the method 200 includes subsequently resolving the first IP address to a second device name. The method 200 also includes process block 240 for generating a profile of the first IP address having been resolved to both the first and second device names. It is to be understood that additional operations may be performed between the process steps mentioned here or in addition to those steps.

Process block 210 for determining IP addresses is described in greater detail in FIG. 3. In process block 212 the process 210 collects traffic from the devices 130, 140. As explained above, the traffic is preferably passively collected by the gateway 122 via replication from the network service provider 124. Also, in process block 214 one or more of the devices 130, 140 may be queried for its IP address. Preferably, both collection of network traffic and querying of the devices 130, 140 are performed for ascertaining IP addresses because one or both may fail at determining the correct IP address. However, in one or more embodiments, either collecting the network traffic or querying for an IP address may be performed without the other. Thus, in process block 216 the IP address is determined from the collected traffic and/or as a result of querying a device for its IP address. From process block 218, the process proceeds to process block 220 as shown in FIG. 2.

The method 200 may also include one or more optional steps. Thus, the method 200 may also include process block 250 for updating a cache and utilizing the cache to generate the profile of the IP address. The method 200 may also include process block 252 for querying the profile to determine whether the first or second device name was associated with the first IP address during a period of time. The process 200 may also include process block 254 for resolving a second IP address to third and fourth device names. The process 200 may also include process block 260 for generating a profile for the second IP address having third and fourth device names. The process 200 may also include process block 262 for querying the profile of the second IP address to determine whether the third device name or the fourth device name was associated with the second IP address during a period of time.

Embodiments, for example, are described above with reference to block diagrams and/or operational illustrations of methods, systems, and computer program products according to embodiments. The functions/acts noted in the blocks may occur out of the order as shown in any flowchart or described herein with reference to the Figures. For example, two steps or processes shown or described in succession may in fact be executed substantially concurrently or the blocks may sometimes be executed in the reverse order, depending upon the functionality/acts involved.

Figure 4:
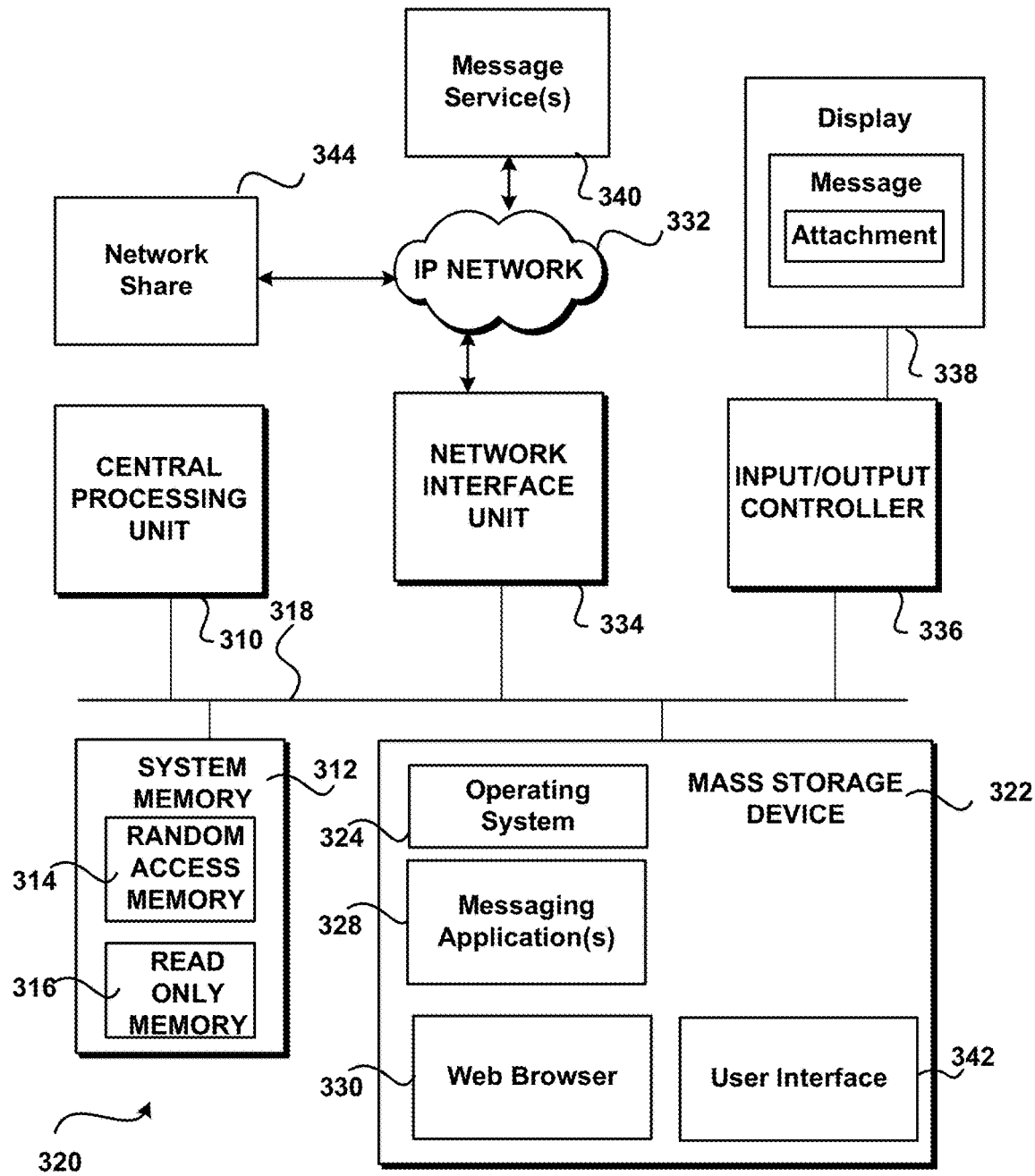
FIG. 4 illustrates an exemplary embodiment of physical components for a device/computer utilized in the various embodiments.

FIG. 4 and the corresponding discussion are intended to provide a brief, general description of a suitable computing environment in which embodiments may be implemented. Generally, program modules include routines, programs, components, data structures, and other types of structures that perform particular tasks or implement particular abstract data types. Other computer system configurations may also be used, including hand-held devices, multiprocessor systems, microprocessor-based or programmable consumer electronics, minicomputers, mainframe computers, and the like. Distributed computing environments may also be used where tasks are performed by remote processing devices that are linked through a communications network. In a distributed computing environment, program modules may be located in both local and remote memory storage devices.

Still referring to FIG. 4, an illustrative computer environment for a computer 320 utilized in the various embodiments will be described. The computer environment shown in FIG. 4 includes computing devices that each may be configured as a mobile computing device (e.g. phone, tablet, net book, laptop), server, a desktop, or some other type of computing device and include a central processing unit 310 ("CPU"), a system memory 312, including a random access memory 314 ("RAM") and a read-only memory ("ROM") 316, and a system bus 318 that couples the memory to the CPU 310.

A basic input/output system containing the basic routines that help to transfer information between elements within the computer, such as during startup, is stored in the ROM 316. The computer 320 further includes a mass storage device 322 for storing an operating system 324, attachment manager 326, messaging application 328 and web browser 330.

The mass storage device 322 is connected to the CPU 310 through a mass storage controller (not shown) connected to the bus 318. The mass storage device 322 and its associated computer-readable media provide non-volatile storage for the computer 320. Although the description of computer-readable media contained herein refers to a mass storage device, such as a hard disk or CD-ROM drive, the computer-readable media can be any available media that can be accessed by the computer 320.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, Erasable Programmable Read Only Memory ("EPROM"), Electrically Erasable Programmable Read Only Memory ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 320.

Computer 320 operates in a networked environment using logical connections to remote computers through a network 332, such as the Internet. The computer 320 may connect to the network 332 through a network interface unit 334 connected to the bus 318. The network connection may be wireless and/or wired. The network interface unit 334 may also be utilized to connect to other types of networks and remote computer systems. The computer 320 may also include an input/output controller 336 for receiving and processing input from a number of other devices, including a keyboard, mouse, or electronic stylus (not shown). Similarly, the input/output controller 336 may provide input/output to a scanner, a camera, a display screen 338, a printer, or other type of input and/or output device. Display 338 is configured to display representations of the messages received via the messaging application 328.

As mentioned briefly above, a number of program modules and data files may be stored in the mass storage device 322 and RAM 314 of the computer 320, including an operating system 324 suitable for controlling the operation of a computer, such as the WINDOWS 10®, WINDOWS 10 Mobile®, or WINDOWS SERVER® operating system from MICROSOFT CORPORATION of Redmond, Wash. The mass storage device 322 and RAM 314 may also store one or more program modules. In particular, the mass storage device 322 and the RAM 314 may store one or more application programs, including one or messaging applications 328 and Web browser 330.

User interface 342 is used by a user to interact with applications and documents. Messaging application 328 may be one or more different messaging applications. For example, the computing device may include an email application, an Instant Messaging (IM) application, an SMS, MMS application, a real-time information network (e.g. Twitter® interface), a social networking application, and the like. According to an embodiment, messaging application 328 is an email application, such as MICROSOFT OUTLOOK®. The messaging application(s) may be client based and/or web based. For example, a network based message service 340 may be used, such as: MICROSOFT WINDOWS LIVE or some other network based email and messaging service.

Network share 344 is configured to store content (e.g. documents, spreadsheet, images, video, Web content, and the like) that are accessible to one or more users through IP network 332. For example, network share 344 may store content that is accessible by users located at one or more locations.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope.

What is claimed is:

1. A method for performing IP to name resolution in a network utilized by a plurality of devices, the method comprising:
   determining a first IP address associated with a first device from the plurality of devices;
   resolving the first IP address to a first device name associated with the first device at a first resolution time;
   subsequently resolving the first IP address to a second device name associated with a second device from the plurality of devices at a second resolution time; and
   generating a profile for the first IP address, the profile comprised of a timeline including the first device name at the first resolution time and the second device name at the second resolution time such that the profile can be queried to determine which device name is associated with the first IP address during a period of time.

2. The method of claim 1 wherein determining the first IP address associated with the first device comprises querying the first device to ascertain the first IP address.

3. The method of claim 1 wherein determining the first IP address associated with the first device comprises collecting traffic over the network from the plurality of devices and determining from the collected traffic the first IP address associated with the first device.

4. The method of claim 1 wherein determining the first IP address associated with the first device comprises both:
   actively querying the first device to ascertain the first IP address; and
   passively collecting traffic over the network from the first device and determining from the collected traffic that the first IP address is associated with the first device.

5. The method of claim 1 further comprising passively collecting traffic over the network from the plurality of devices.

6. The method of claim 5 further comprising determining the first IP address from packets of the collected traffic.

7. The method of claim 1 further comprising querying the profile to determine whether the first device name or the second device name was associated with the first IP address during the period of time.

8. The method of claim 1 further comprising:
   determining a second IP address associated with a third device from the plurality of devices;
   resolving the second IP address to a third device name associated with the third device;
   subsequently resolving the second IP address to a fourth device name associated with a fourth device from the plurality of devices; and
   generating a profile for the second IP address having been resolved to the third device name and the fourth device name.

9. The method of claim 8 further comprising querying the profile of the second IP address to determine whether the third device name or the fourth device name was associated with the second IP address during a period of time.

10. The method of claim 1 wherein generating the profile for the first IP address further comprises generating the profile to also include a second IP address having been resolved to at least one device name.

11. The method of claim 10 further comprising querying the profile to determine device names associated with the first IP address and the second IP address during one or more periods of time.

12. The method of claim 1 further comprising updating a cache and utilizing the cache to generate the profile for the first IP address.

13. The method of claim 1 further comprising generating a second profile for a second IP address and a timeline including a third device name and a fourth device name.

14. A system including a processor and a memory device including processor executable instructions for performing IP to name resolution in an enterprise network comprised of a plurality of locations to which devices access the enterprise network, comprising:
   a network service provider operable to authenticate devices seeking to access the enterprise network;
   a gateway, in communication with the network service provider, operable to monitor communications from a plurality of devices accessing the enterprise network via the network service provider to collect traffic; and
   a center, in communication with the gateway, operable to:
      aggregate connection information from the plurality of devices;
      receive the collected traffic from the gateway;
      based on the connection information and the collected traffic, determine a first IP address associated with a first device from the plurality of devices;
      resolve the first IP address to a first device name associated with the first device at a first resolution time;
      subsequently resolve the first IP address to a second device name associated with a second device from the plurality of devices at a second resolution time; and
      generate a profile for the first IP address comprised of a timeline including the first device name at the first resolution time and the second device name at the second resolution time such that the profile can be queried to determine which device name is associated with the first IP address during a period of time.

15. The system of claim 14 wherein the center is further operable to query the profile to determine whether the first device name or the second device name was associated with the first IP address during the period of time.

16. The system of claim 14 wherein to determine the first IP address associated with the first device, the first device is queried to ascertain the first IP address.

17. The system of claim 14 wherein to determine the first IP address associated with the first device, traffic from the plurality of devices is collected and the first IP address associated with the first device is determined from the collected traffic.

18. A computer-readable storage medium including instructions for performing IP to name resolution in an enterprise network utilized by a plurality of devices, which when executed by a processor are operable to:

determine a first IP address associated with a first device from the plurality of devices by at least one of actively querying the first device to ascertain the first IP address and passively collecting traffic over the enterprise network from the first device to determine that the first IP address is associated with the first device based on the collected traffic;

resolve the first IP address to a first device name associated with the first device at a first resolution time;

subsequently resolve the first IP address to a second device name associated with a second device from the plurality of devices at a second resolution time;

generate a profile for the first IP address, the profile comprised of a timeline including the first device name at the first resolution time and the second device name at the second resolution time; and query the profile to determine whether the first device name or the second device name was associated with the first IP address during a period of time.

* * * * *